US010963069B1

(12) United States Patent
Wu et al.

(10) Patent No.: US 10,963,069 B1
(45) Date of Patent: Mar. 30, 2021

(54) MOUSE DEVICE AND CONTROL METHOD THEREOF

(71) Applicant: Primax Electronics Ltd., Taipei (TW)

(72) Inventors: Jian-Bin Wu, Taipei (TW); Quan Xia, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/723,941

(22) Filed: Dec. 20, 2019

(30) Foreign Application Priority Data

Nov. 8, 2019 (CN) ........................ 201911086879.5

(51) Int. Cl.
*G06F 3/03* (2006.01)
*G06F 3/0362* (2013.01)
*G06F 3/0354* (2013.01)

(52) U.S. Cl.
CPC .......... *G06F 3/0312* (2013.01); *G06F 3/0362* (2013.01); *G06F 3/03543* (2013.01)

(58) Field of Classification Search
CPC .. G06F 3/03543; G06F 3/0362; G06F 3/0485; G06F 3/0312; G06F 16/9038; G06F 3/038; G06F 3/04847; G06F 3/0304; G06F 3/04812
See application file for complete search history.

(56) References Cited

U.S. PATENT DOCUMENTS

| | | | | |
|---|---|---|---|---|
| 5,748,181 A * | 5/1998 | Fu | G06F 3/0312 | 250/231.12 |
| 6,097,319 A * | 8/2000 | Liu | G01D 5/24476 | 341/144 |
| 6,570,108 B2 * | 5/2003 | Lin | G06F 3/03543 | 200/11 R |
| 2010/0085306 A1 * | 4/2010 | Wu | G06F 3/03543 | 345/163 |
| 2010/0090955 A1 * | 4/2010 | Chen | G06F 3/0317 | 345/166 |
| 2013/0027308 A1 * | 1/2013 | Peng | G06F 3/03543 | 345/163 |
| 2014/0145954 A1 * | 5/2014 | Wu | G06F 3/0304 | 345/163 |

* cited by examiner

*Primary Examiner* — Sanjiv D. Patel
(74) *Attorney, Agent, or Firm* — Kirton McConkie; Evan R. Witt

(57) ABSTRACT

A mouse device includes a casing, a scroll wheel, a circuit board, an encoder and a microprocessor. The scroll wheel is partially exposed outside the casing. The circuit board is disposed within the casing. The encoder is disposed within the casing. The encoder issues an encoded signal to the circuit board in response to a rotation of the scroll wheel. The microprocessor is electrically connected with the circuit board, and acquires a rotating time period corresponding to one-unit rotation amount of the scroll wheel. If the rotating time period is shorter than a predetermined time period, the microprocessor generates a first control command. If the rotating time period is longer than or equal to the predetermined time, the microprocessor generates a second control command.

11 Claims, 5 Drawing Sheets

MOUSE DEVICE AND CONTROL METHOD THEREOF

FIELD OF THE INVENTION

The present invention relates to an input device, and more particularly to a mouse device.

BACKGROUND OF THE INVENTION

The widely-used input devices include for example mouse devices, keyboard devices or trackballs. As known, mouse devices are prevailing because they are very easy-to-use. When a mouse device is held by a user's palm, the user may move the mouse device to control movement of the cursor shown on the computer screen. In addition, by manipulating the buttons of the mouse device with the user's fingers, the user may click and select a desired icon shown on the computer screen or execute a corresponding function. As a consequence, most users and most manufacturers of the input devices pay much attention to the keyboard devices. For meeting specified requirements (e.g., the requirements of browsing web pages or browsing documents), the mouse device is equipped with a scroll wheel. By rotating the scroll wheel, the contents of the window to be browsed are scrolled upwardly or downwardly.

Moreover, the conventional mouse device is equipped with an encoder to sense the rotation amount of the scroll wheel. According to the rotation amount of the scroll wheel, the encoder generates a corresponding control command. According to the control command, the scroll amount of the window to be browsed is correspondingly controlled. For example, when the scroll wheel is rotated for one unit, the mouse device generates a one-step control command. Consequently, the window to be browsed is scrolled for one-step scroll amount. For example, when the scroll wheel is rotated for one turn, the rotation amount of the scroll wheel is about 20-24 units.

As mentioned above, the rotation amount of the scroll wheel is related to the scroll amount of the window to the browsed. In case that the contents of the window to be browsed are not large, the process of rotating the scroll wheel to browse the contents of the window is easy to the user. However, in case that the contents of the window to be browsed are large, some drawbacks occur. For example, if the user intends to switch the contents of the window of 100 pages from the 5-th page to the 45-th page, the user has to rotate the scroll wheel continuously. For example, if the process of scrolling one page of the browsed window needs 10-unit rotation amount of the scroll wheel, the process of switching the contents of the window of 100 pages from the 5-th page to the 45-th page needs 400-unit rotation amount of the scroll wheel. Since the user has to continuously rotate the scroll wheel to browse the window, the conventional mouse device is not user-friendly.

In other words, the conventional mouse device and the control method of the mouse device need to be further improved.

SUMMARY OF THE INVENTION

The present invention provides a mouse device. A microprocessor of the mouse device generates a control command according to a rotating speed of the scroll wheel. According to the control command, an object to be controlled executes a specified function at a corresponding operating speed.

Another object of the present invention provides a control method for the mouse device.

In accordance with an aspect of the present invention, a mouse device is provided. The mouse device includes a casing, a scroll wheel, a circuit board, an encoder and a microprocessor. The scroll wheel is partially exposed outside the casing. The circuit board is disposed within the casing. The encoder is disposed within the casing. The encoder issues an encoded signal to the circuit board in response to a rotation of the scroll wheel. The microprocessor is electrically connected with the circuit board, and acquires a rotating time period corresponding to one-unit rotation amount of the scroll wheel. If the rotating time period is shorter than a predetermined time period, the microprocessor generates a first control command. If the rotating time period is longer than or equal to the predetermined time, the microprocessor generates a second control command.

In accordance with another aspect of the present invention, a control method for a mouse device is provided. The mouse device includes a scroll wheel. The control method includes the following steps. Firstly, an encoded signal is generated in response to a rotation of the scroll wheel. Then, a rotating time period corresponding to a one-unit rotation amount of the scroll wheel is acquired according to the encoded signal. If the rotating time period is shorter than a predetermined time period, a first control command is generated. If the rotating time period is longer than or equal to the predetermined time period, a second control command is generated.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
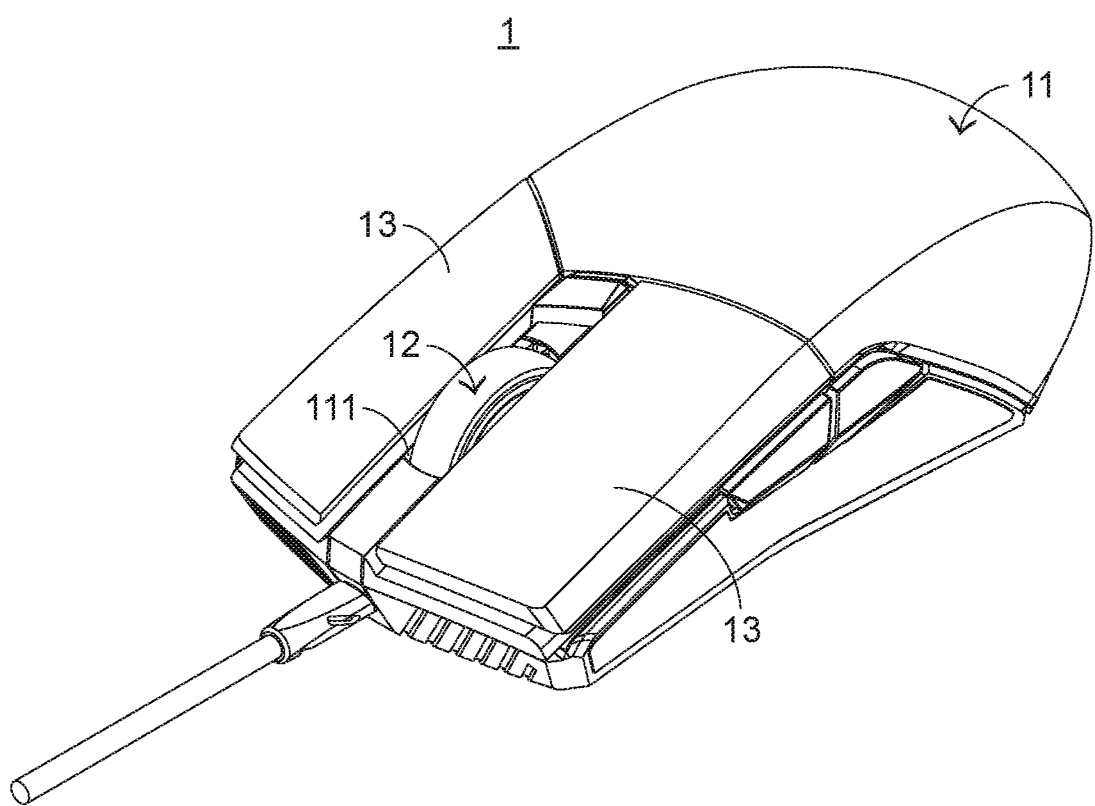
FIG. 1 is a schematic perspective view illustrating the appearance of a mouse device according to an embodiment of the present invention.

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
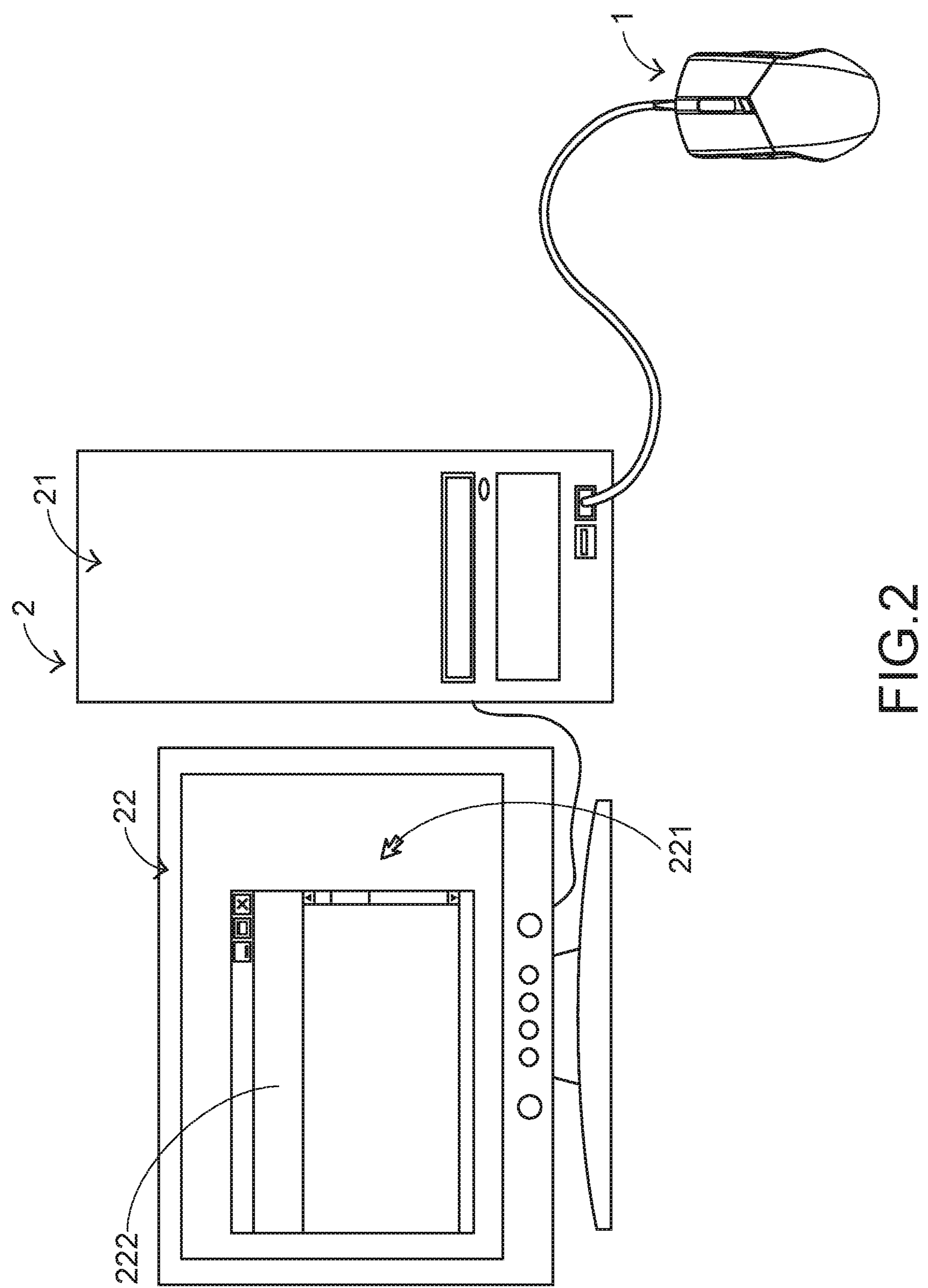
FIG. 2 schematically illustrates the connection between the mouse device as shown in FIG. 1 and an electronic device.

Please refer to FIGS. 1 and 2. FIG. 1 is a schematic perspective view illustrating the appearance of a mouse device according to an embodiment of the present invention. FIG. 2 schematically illustrates the connection between the mouse device as shown in FIG. 1 and an electronic device. In an embodiment, the electronic device is a computer system 2. The computer system 2 comprises a computer host 21 and a computer screen 22. The computer host 21 is in communication with the mouse device 1 and the computer screen 22. In this embodiment, the computer host 21 is in communication with the mouse device 1 and the computer screen 22 in a wired transmission manner. Alternatively, the computer host is in communication with the mouse device and the computer screen in a wireless transmission manner. A cursor 221 and a graphic-based window 222 are displayed on the computer screen 22. When the user's palm holds the mouse device 1 to move the mouse device 1, the cursor 221 shown on the computer screen 22 is correspondingly moved by the computer host 21 according to the displacement amount of the mouse device 1. The implementation examples and principles of operating the mouse device 1 to control the cursor 221 on the computer screen 22 are well known to those skilled in the art, and are not redundantly described herein.

Figure 3:
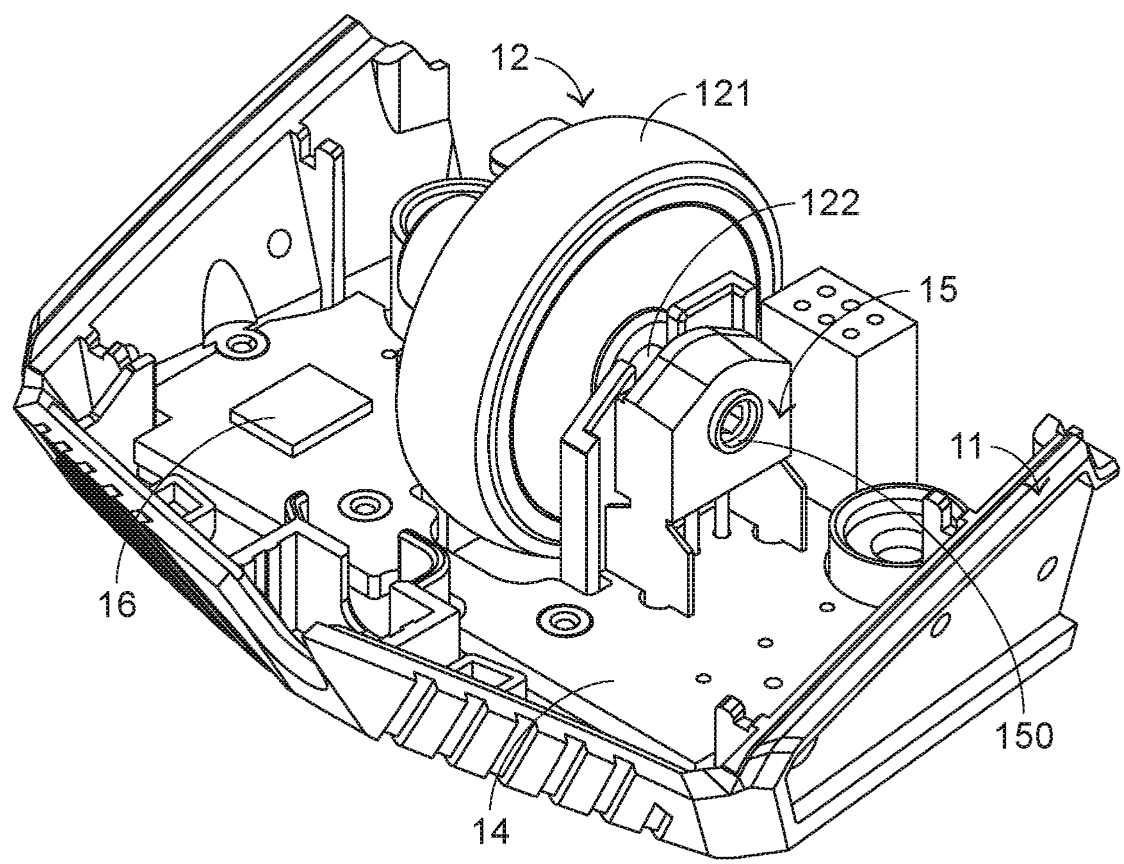
FIG. 3 is a schematic perspective view illustrating a portion of the mouse device as shown in FIG. 1.
Figure 4:
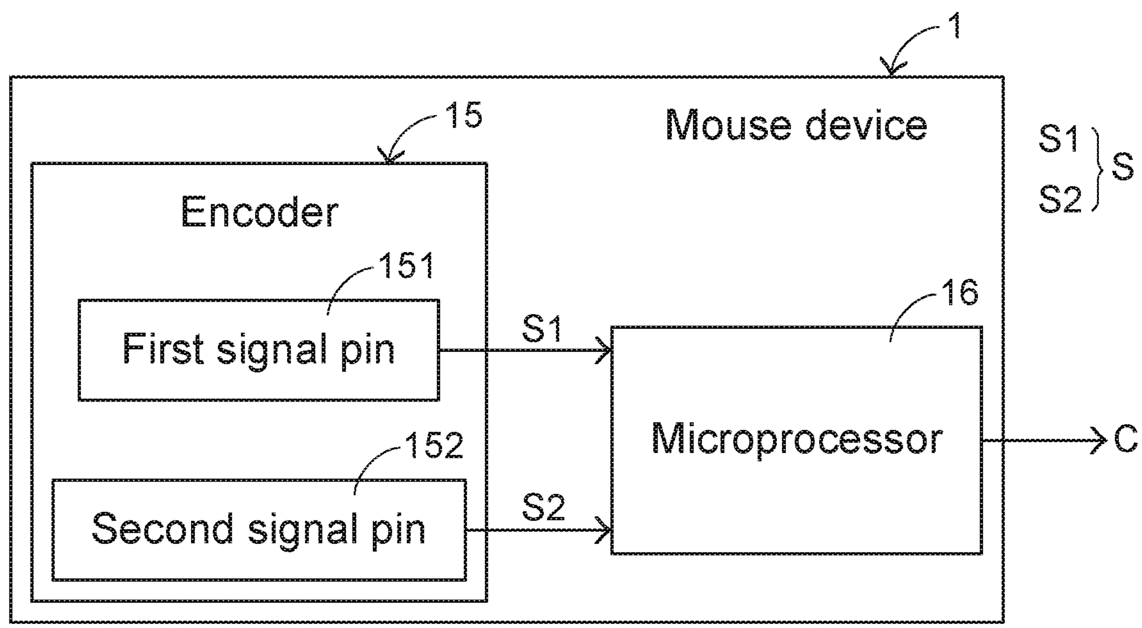
FIG. 4 is a schematic block circuit diagram illustrating the signal transmission of the mouse device as shown in FIG. 1.

Please refer to FIGS. 3 and 4. FIG. 3 is a schematic perspective view illustrating a portion of the mouse device as shown in FIG. 1. FIG. 4 is a schematic block circuit diagram illustrating the signal transmission of the mouse device as shown in FIG. 1. The mouse device 1 comprises a casing 11, a scroll wheel 12, left/right buttons 13, a circuit board 14, an encoder 15 and a microprocessor 16. At least portions of the left/right buttons 13 and the scroll wheel 12 are exposed outside the casing 11. Consequently, the left/right buttons 13 and the scroll wheel 12 can be operated and pressed by the user. The encoder 15 and the microprocessor 16 are electrically connected with the circuit board 14. The encoder 15, the microprocessor 16 and the circuit board 14 are disposed within the casing 11. The scroll wheel 12 comprises a wheel part 121 and a rotation shaft 122. The wheel part 121 is partially penetrated through an opening 111 of the casing 11. The rotation shaft 122 is perpendicular to and connected with the wheel part 121. In addition, the rotation shaft 122 is inserted into a pivotal hole 150 of the encoder 15. When the user's finger is placed on the scroll wheel 12 to rotate the scroll wheel 12, an object shown on the computer screen 22 is correspondingly controlled. For example, the window 222 shown on the computer screen 22 is scrolled in response to the rotation of the scroll wheel 12.

Figure 5:
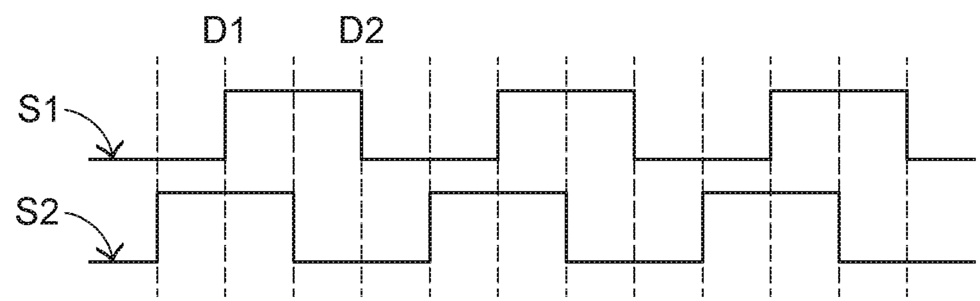
FIG. 5 is a schematic waveform diagram illustrating the first pulse signal and the second pulse signal from the encoder of the mouse device as shown in FIG. 1.

When the scroll wheel 12 is rotated by the user, the encoder 15 issues an encoded signal S to the circuit board 14. According to the encoded signal S, the microprocessor 16 acquires a rotation amount of the scroll wheel 12. According to the rotation amount of the scroll wheel 12, the microprocessor 16 issues a corresponding control command C to control a scroll amount of the window 222 shown on the computer screen 22. In an embodiment, the encoder 15 comprises a first signal pin 151 and a second signal pin 152. When the scroll wheel 12 is rotated, the first signal pin 151 generates a first pulse signal S1 (see FIG. 5) and the second signal pin 152 generates a second pulse signal S2 (see FIG. 5). The rectangular pulses in the first pulse signal S1 and the rectangular pulses in the second pulse signal S2 are orthogonal. Moreover, various encoded signals S are defined by the first pulse signal S1 and the second pulse signal S2 collaboratively. When the scroll wheel 12 is rotated for one turn, each of the first pulse signal S1 and the second pulse signal S2 contains plural rectangular pulses. The number of the rectangular pulses in the first pulse signal S1 and the number of the rectangular pulses in the second pulse signal S2 are equal. Moreover, there are plural phase differences between the first pulse signal S1 and the second pulse signal S2. Moreover, each phase difference (e.g., D1 or D2 as shown in FIG. 5) is correlated with one-unit rotation amount of the scroll wheel 12.

Especially, the microprocessor 16 acquires the rotating time period corresponding to the one-unit rotation amount of the scroll wheel 12 according to the first pulse signal S1 and the second pulse signal S2. If the rotating time period corresponding to the one-unit rotation amount of the scroll wheel 12 is shorter than a predetermined time period, the microprocessor 16 issues a first control command. Whereas, if the rotating time period corresponding to the one-unit rotation amount of the scroll wheel 12 is not shorter than the predetermined time period, the microprocessor 16 issues a second control command.

In an embodiment, the window 222 shown on the computer screen 22 is scrolled according to the first control command or the second control command. According to the first control command from the microprocessor 16, the window 222 shown on the computer screen 22 is scrolled at a first speed. According to the second control command from the microprocessor 16, the window 222 shown on the computer screen 22 is scrolled at a second speed. Preferably but not exclusively, the first speed is a specified multiple of the second speed. For example, the first speed is two times, three times or four times the second speed.

In an embodiment, the firmware in the microprocessor 16 of the mouse device 1 has the following settings. If the rotating time period corresponding to the one-unit rotation amount of the scroll wheel 12 is longer than or equal to 0.2 second (i.e., the predetermined time period), the mouse device 1 issues a one-step control command (i.e., the second control command). Whereas, if the rotating time period corresponding to the one-unit rotation amount of the scroll wheel 12 is shorter than 0.2 second (i.e., the predetermined time period), the mouse device 1 issues a two-step control command (i.e., the first control command). Moreover, whenever the mouse device 1 issues the 10-step control command, the one-page content of the window 222 shown on the computer screen 22 is scrolled. For example, the contents of the window 222 shown on the computer screen 22 are very large (e.g., 100 pages). If the user intends to switch the contents of the window of 100 pages from the 5-th page to the 45-th page, the mouse device 1 issues the control command corresponding to 400 steps. According to the above settings, the following results are obtained. If the scroll wheel 12 is rotated slowly and the rotating time period corresponding to the one-unit rotation amount of the scroll wheel 12 is longer than or equal to 0.2 second, the process of switching the contents from the 5-th page to the 45-th page needs 400-unit rotation amount of the scroll wheel 12. Whereas, if the scroll wheel 12 is rotated quickly and the rotating time period corresponding to the one-unit rotation amount of the scroll wheel 12 is shorter than 0.2 second, the process of switching the contents from the 5-th page to the 45-th page needs 200-unit rotation amount of the scroll wheel 12. Under this circumstance, the speed of scrolling the contents of the window 222 is doubled.

The above example is presented herein for purpose of illustration and description only. The predetermined time period corresponding to the one-unit rotation amount of the scroll wheel 12, the relation between the first speed and the second speed and the controlled object of the scroll wheel 12 may be altered according to the practical requirements. In the above embodiment, the controlled object of the scroll wheel 12 is the window 222 shown on the computer screen 22. Alternatively, in another embodiment, the controlled object of the scroll wheel is the object of a specified gaming software.

Figure 6:
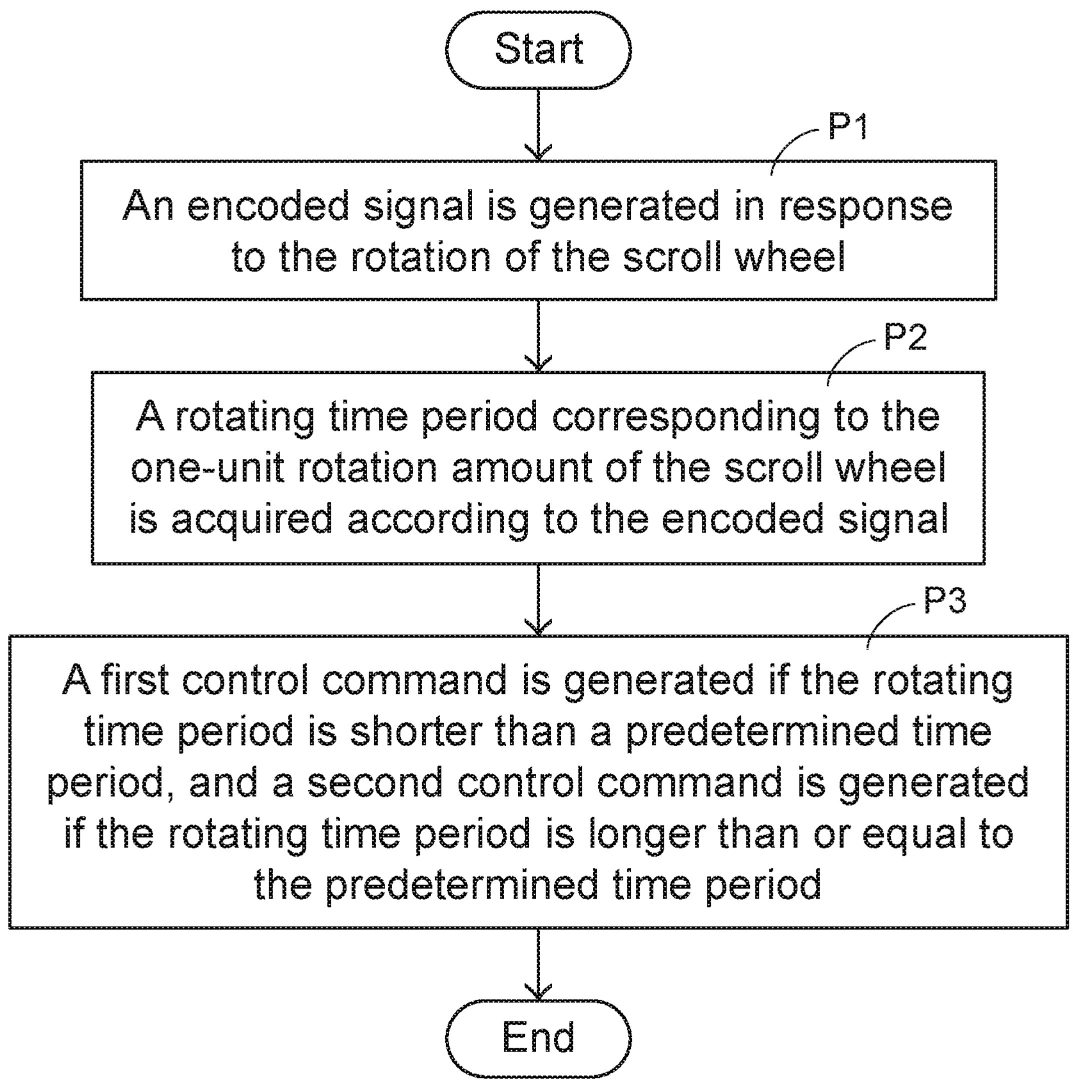
FIG. 6 is a flowchart illustrating a control method for the mouse device according to an embodiment of the present invention.

The present invention also provides a control method for the mouse device. FIG. 6 is a flowchart illustrating a control method for the mouse device according to an embodiment of the present invention. The control method comprises the following steps.

In a step P1, an encoded signal S is generated in response to the rotation of the scroll wheel 12.

In a step P2, a rotating time period corresponding to the one-unit rotation amount of the scroll wheel 12 is acquired according to the encoded signal S.

In a step P3, a first control command is generated if the rotating time period is shorter than a predetermined time period, and a second control command is generated if the rotating time period is longer than or equal to the predetermined time period.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:

a casing;

a scroll wheel partially exposed outside the casing;

a circuit board disposed within the casing;

an encoder disposed within the casing, wherein the encoder issues an encoded signal to the circuit board in response to a rotation of the scroll wheel; and a microprocessor electrically connected with the circuit board, and acquiring a rotating time period corresponding to one-unit rotation amount of the scroll wheel, wherein when the rotating time period is shorter than a predetermined time period, the microprocessor generates a first control command, wherein when the rotating time period is longer than or equal to the predetermined time, the microprocessor generates a second control command, wherein a window of an electronic device is scrolled under control of the mouse device, wherein when the microprocessor generates the first control command, the window is scrolled at a first speed relative to the one-unit rotation amount of the scroll wheel, wherein when the microprocessor generates the second control command, the window is scrolled at a second sped relative to the one-unit rotation amount of the scroll wheel.

2. The mouse device according to claim 1, wherein the first speed is a multiple of the second speed.

3. The mouse device according to claim 1, wherein the scroll wheel is partially penetrated through an opening of the casing, so that the scroll wheel is permitted to be contacted with and rotated by a finger of a user.

4. The mouse device according to claim 3, wherein the scroll wheel comprises a wheel part and a rotation shaft, wherein the wheel part is partially penetrated through the opening of the casing, and the rotation shaft is perpendicular to and connected with the wheel part.

5. The mouse device according to claim 4, wherein the rotation shaft is inserted into a pivotal hole of the encoder, so that the encoder issues the encoded signal to the circuit board in response to the rotation of the scroll wheel.

6. The mouse device according to claim 1, wherein the encoder comprises a first signal pin, and the first signal pin generates a first pulse signal in response to the rotation of the scroll wheel.

7. The mouse device according to claim 6, wherein the encoder further comprises a second signal pin, and the second signal pin generates a second pulse signal in response to the rotation of the scroll wheel, wherein rectangular pulses in the first pulse signal and corresponding rectangular pulses in the second pulse signal are orthogonal, and the encoded signal is defined by the first pulse signal and the second pulse signal collaboratively.

8. The mouse device according to claim 6, wherein the encoder further comprises a second signal pin, and the second signal pin generates a second pulse signal in response to the rotation of the scroll wheel, wherein there are plural phase differences between the first pulse signal and the second pulse signal, and each of the plural phase differences is correlated with the one-unit rotation amount of the scroll wheel.

9. A control method for a mouse device, the mouse device comprising a scroll wheel, the control method comprising steps of:

generating an encoded signal in response to a rotation of the scroll wheel;

acquiring a rotating time period corresponding to a one-unit rotation amount of the scroll wheel according to the encoded signal;

when the rotating time period is shorter than a predetermined time period, generating a first control command; and when the rotating time period is longer than or equal to the predetermined time period, generating a second control command, wherein a window of an electronic device is scrolled under control of the mouse device, wherein when the microprocessor generates the first control command, the window is scrolled at a first speed relative to the one-unit rotation amount of the scroll wheel, wherein when the microprocessor generates the second control command, the window is scrolled at a second-speed relative to the one-unit rotation amount of the scroll-wheel.

10. The control method according to claim 9, wherein the first speed is a multiple of the second speed.

11. The control method according to claim 9, wherein the encoded signal is defined by a first pulse signal and a second pulse signal collaboratively, there are plural phase differences between the first pulse signal and the second pulse signal, and each of the plural phase differences is correlated with the one-unit rotation amount of the scroll wheel.

* * * * *